Nov. 18, 1930.   E. E. WEMP   1,782,158

DIFFERENTIAL ACTION CLUTCH

Filed Aug. 24, 1928   2 Sheets-Sheet 2

INVENTOR.
Ernest E. Wemp.
BY
ATTORNEY.

Patented Nov. 18, 1930

1,782,158

UNITED STATES PATENT OFFICE

ERNEST E. WEMP, OF DETROIT, MICHIGAN

DIFFERENTIAL-ACTION CLUTCH

Application filed August 24, 1928. Serial No. 301,803.

This invention relates to a differential action clutch and has to do particularly with a novel, compact differential acting means so co-operating with the driving and driven members of a clutch as to materially smooth out the initial clutching action.

It is universally recognized that the problem of shifting gears and the transmission of power through said gears is one of the major problems of automotive engineering. It is particularly true in the stepping down of the shifting action, or in other words, the shifting from a high speed to a lower speed. Many devices have been proposed in an attempt to equalize the speed of the driving and driven members during the shifting action, but such attempts have been directed primarily to a braking action, with the result that in the most of such attempts, the improvement has been in the stepping up action with proportionate difficulty in the meshing of the gears during the stepping down or retarding action.

It is the object of the present invention to substitute differential acting elements in the form of pinions and a master gear for the usual driven disc in the standard disc or plate type of clutch construction. The direct result of such substitution is that it causes a smooth action, whether the shifting is a step up shifting or acceleration, or a step down or retarding of the speed of the vehicle.

A further object of the present invention resides in the novel and compact manner of arranging the differential acting mechanism in combination with the driving and driven elements of the clutch. A further very important feature resides in the positioning and design of such differential acting and inertia governing means, whereby such means produce an equalizing effect on the speed of the respective elements and at the same time effects such a novel result with a minimum of friction. In other words, the pinions of the differential gear structure are so positioned and supported as to present a minimum amount of friction, the inertia governing effect being produced primarily by the weight or inertia of the pinions themselves.

Other important and novel features will be brought out in the specification and claims.

Figure 1:
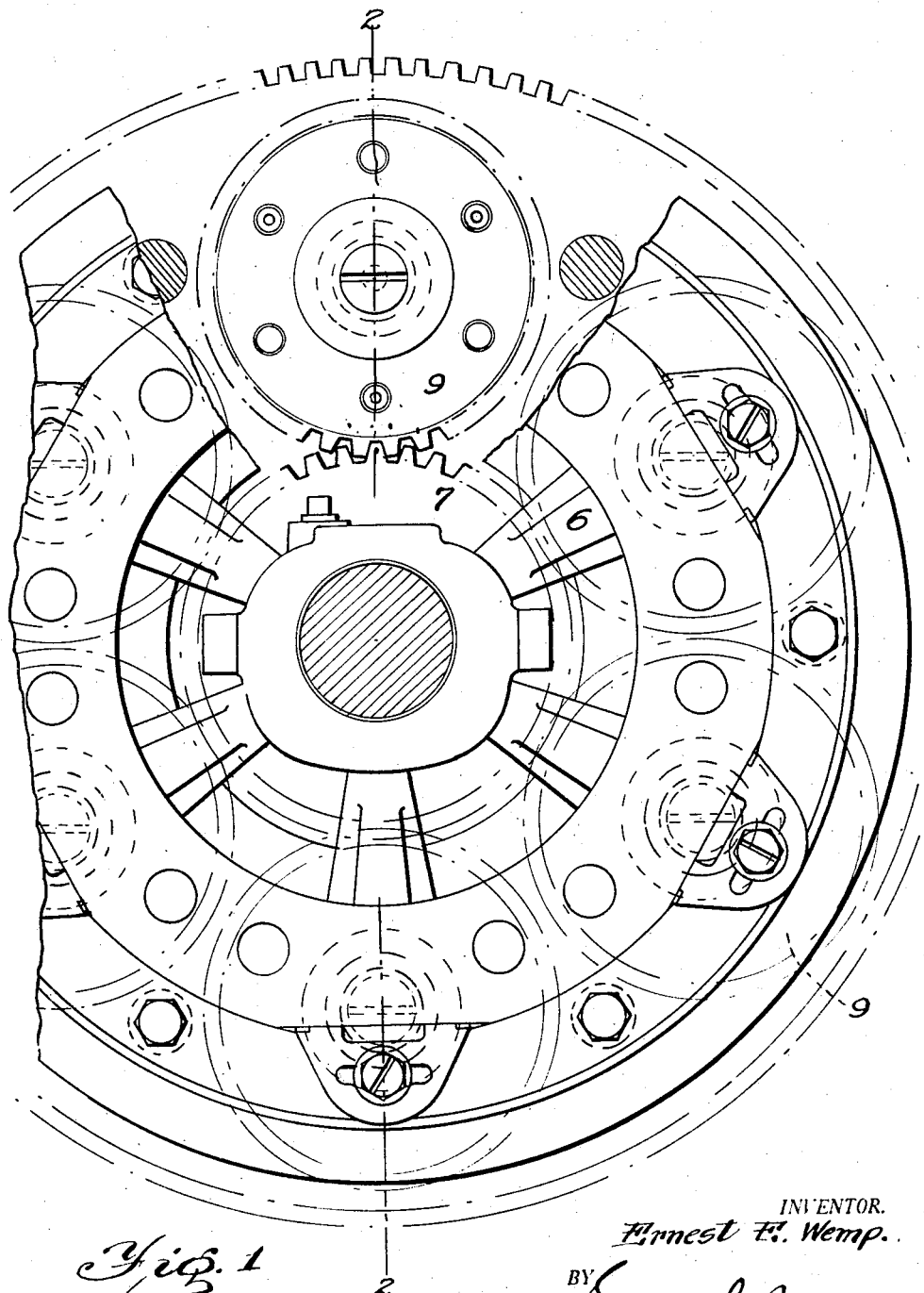
Fig. 1 is an elevation, partly cut away, of my novel clutch structure, and showing primarily the relative positioning of the differential mechanism, consisting of the central master gear and the concentrically arranged pinions.
Figure 2:
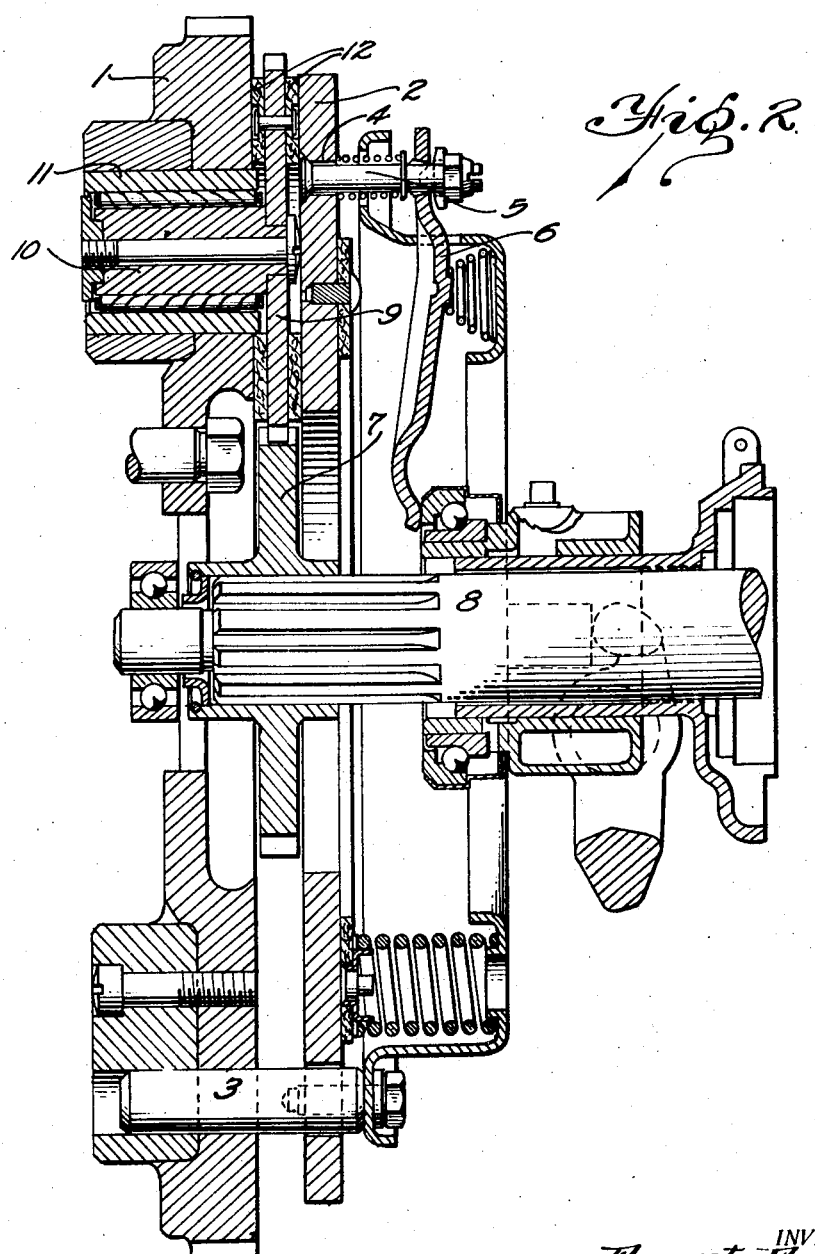
Fig. 2 is a longitudinal section taken on line 2—2 of Fig. 1, illustrating in particular the manner of mounting the pinions in the fly-wheel and also showing the manner of mounting the friction facing on the pinions instead of on the driven disc.

It will be understood that my novel differential type of mechanism may be used in connection with any standard type of clutch without deviating from the broad invention here involved, and that furthermore, various types of differential mechanism may be used in effecting the transmission of power from the driving and driven elements of the clutch.

To best illustrate the present invention, I have shown the same as embodied in connection with a clutch such as is well illustrated in my pending application, #139,826, filed October 6, 1926.

In this clutch structure, the driving element consists of the fly-wheel 1 and the pressure plate or ring 2, connected to the fly-wheel by means of suitable driving pins 3. The plate or pressure ring 2 is provided with a plurality of countersunk openings 4 for receiving pins 5 which act as connecting means between the pressure relieving levers 6 and the pressure member 2.

The cover plate, coil springs, et cetera, are merely details in the formation of the clutch structure as will be obvious to one skilled in the art, and are fully described in my said above named application. Suffice it to say here that movement of the clutch pedal will result in the movement of the levers 6 upon their fulcrums to move the pressure member 2 toward or away from the fly-wheel.

The parts making up the differential mechanism are preferably interposed between the pressure member 2 and the fly-wheel 1 and consist of a master gear 7 which is splined to the driven member 8, the teeth of which master gear 7 are adapted to engage with the teeth of a series of pinions 9 which are spaced circumferentially around the master gear, as best shown in Fig. 1.

Pinion 9 is mounted upon or includes a suitable stub shaft 10 which in turn is rotatably mounted as by roller bearings 11 within a suitable bearing sleeve or opening in the fly-wheel 1. In other words, pinion 9 is rotatably mounted in the fly-wheel portion of the driving member and roller bearings are preferably utilized, whereby these pinions may rotate with a minimum amount of friction.

The pinions 9 are provided with a suitable annular clutch facing 12 on each side thereof, and it will thus be seen that as the master gear 7 of the differential is splined to the driven shaft, that the pinions 9 are mounted to be bodily rotated with the driving member and are controlled as to relative rotation about their own axes by the pressure applied thereto by the driving member.

This positioning of the differential mechanism to act complementally and simultaneously upon both the driving and driven members results in two distinct and novel functions which may be best understood by describing the operation of the clutch. First, it will be obvious that, as the pressure plate 2 is moved away from contact with the pinions 9 by a declutching operation, the pinions will then be free to rotate about their own axes and around the master gear 7 so that the driving member will rotate without moving the driven member.

Assuming that the driven shaft is stationary, and that the plate 2 has been moved away by the declutching action, and further assuming that the master gear 7 and pinion gears 9 have a 1 to 1 ratio, then it will be seen that if the fly-wheel for example, revolves at 1000 R. P. M. that each pinion would also rotate about its own axis at 1000 R. P. M. Having brought the low or intermediate gear into mesh, it will be seen that as the pressure plate 2 is moved against the clutch facings on the pinions, that such pinions will be slowed up. If such pinions are slowed up so that they rotate only 950 R. P. M., then the driven shaft will rotate at 50 R. P. M., while the fly-wheel rotates at 1000 R. P. M. As the pressure plate 2 gradually moves toward the fly-wheel, it will be seen that the relative rotation of each pinion will be gradually slowed up and the R. P. M. of the driven shaft gradually increased, with the result that a sudden application of the load will be substantially eliminated.

Not only does this intermediate differential mechanism insure a gradual transmission of power from a standing start, but it is also a positive means of acting simultaneously upon both driving and driven members for affecting their respective speeds during the declutching action.

As part of the differential mechanism, namely, the pinions 9, are preferably carried by the fly-wheel, while the master gear 7 is splined to the driven shaft, the pinion members 9, while they are not directly connected to either the driving or driven members, are free to rotate, and at the same time have an inertia governing effect upon the driving and driven members.

Assuming that it is desired to shift from low to higher gear, it will be obvious that upon the declutching action, de-accelerating and movement of the shifting lever to neutral, the tendency of the driving member will be to rotate at a lower R. P. M. than the driven member. However, just prior to this declutching action, the pinion gears 9 will have been stationary upon their axes and it will be seen that after the declutching action and slowing down of the engine, and with the fly-wheel rotating at a lower R. P. M. than the driven member, that there will be a tendency for the pinions to rotate about their own axes. Each pinion being stationary it will be obvious that it requires considerable force to overcome this zero inertia, with the result that the driven shaft will be slowed down. In other words, the inertia required to set up rotation in the pinions will act against the fly-wheel at the pivot point of each pinion, and a reaction to this movement of the pinions will take place at the point of meshing of the pinion and the master gear, in a direction which will tend to decrease the R. P. M. of said master gear. The pinions 9 though freely mounted and practically frictionless at the same time act as inertia governors for the driving and driven elements so as to effect noiseless meshing of the transmission gears.

This same action is repeated in stepping down the transmission gears. In this case, it will be seen that at the declutching action, the R. P. M. of the driven element will be greater than the R. P. M. of the driving element but that in accelerating the motor at this point as is the usual custom, the R. P. M. of the driving element will be instantly greater than the driven element, and such differential movement will result in a tendency to rotate the pinions in the opposite direction, with the obvious result that momentum will be applied at the shaft of each pinion at the same time as the resistance is applied at the point of meshing of the pinion and the master gear, whereby to speed up the R. P. M. of the master gear.

It will thus be obvious that I have provided a simple differential mechanism of only two elements in combination with a clutch structure, whereas to present a very compact and simple assembly. Furthermore, the freely mounted member, or members, of the differential mechanism are not only so mounted as to be practically frictionless, but are preferably provided with such mass as to present the proportionate amount of inertia to govern the driving and driven members. These freely mounted inertia members of the differential movement only come into action as inertia members when there is a relative difference in the R. P. M. between the driving and driven members. From a standing start they operate to gradually transmit power from the driving to the driven member.

What I claim is.

1. In a clutch, the combination of a driving member, stub shafts journaled in the driving member, a pinion mounted on each stub shaft, said pinions having friction material on each side, a pressure plate mounted upon the opposite side of the pinions from the driving member, a driven member including a gear which meshes with the said pinions, and means acting upon a pressure plate to pack the pinions in between the driving member and pressure plate to frictionally hold them against rotation so that they positively drive the geared driven member with the driving member, said pinions being free so as to rotate upon relief of the pressure by the pressure plate, which rotation is effected by relative rotational movement between the driving and driven members, the inertia incident to the setting up of rotary movement of the members being effective so as to tend to cause rotation of the driven member with the driving member.

2. In a clutch, the combination of a flywheel, a plurality of stub shafts circumferentially disposed, a pinion carried by each stub shaft, facing material on opposite sides of the pinions, a pressure plate spaced from the flywheel, means acting upon the pressure plate to pack the pinions between the pressure plate and flywheel, a gear driven member having teeth meshing with the pinions, said pinions serving to drive with positive action the driven member when they are held packed between the flywheel and pressure plate and prevented from rotation, said pinions being free to rotate when released by the pressure plate so that the driven member is not positively driven, the inertia incident to the setting up of the rotation of the pinions being effective to cause the driven member to tend to assume the rotation of the driving member.

In testimony whereof I affix my signature.

ERNEST E. WEMP.